United States Patent

Kaneda et al.

[11] Patent Number: 6,069,222
[45] Date of Patent: May 30, 2000

[54] POLYESTER AND POLYURETHANE DERIVED FROM SPECIFIC ALICYCLIC DIOLS

[75] Inventors: Masato Kaneda; Hiroshi Uchida, both of Oita, Japan

[73] Assignee: Showa Denko K.K., Tokyo, Japan

[21] Appl. No.: 09/122,179

[22] Filed: Jul. 24, 1998

Related U.S. Application Data

[60] Provisional application No. 60/078,672, Mar. 20, 1998, provisional application No. 60/078,673, Mar. 20, 1998, and provisional application No. 60/078,670, Mar. 20, 1998.

[30] Foreign Application Priority Data

| Jul. 24, 1997 | [JP] | Japan | 9-215778 |
| Sep. 11, 1997 | [JP] | Japan | 9-247088 |
| Oct. 23, 1997 | [JP] | Japan | 9-291315 |

[51] Int. Cl.$^7$ ............ C08G 18/32; C08G 63/197; C08G 63/199; C08G 63/133; C08G 63/137
[52] U.S. Cl. ............ 528/74; 528/80; 528/83; 528/85; 528/298; 528/307
[58] Field of Search ............ 528/74, 80, 83, 528/85, 298, 307

[56] References Cited

U.S. PATENT DOCUMENTS

| 2,068,634 | 1/1937 | Bruson et al. | 528/307 |
| 2,106,452 | 1/1938 | Bruson et al. | 528/327 |
| 2,891,930 | 6/1959 | Caldwell et al. | 528/307 |
| 3,907,722 | 9/1975 | Papa et al. | 521/115 |
| 4,181,810 | 1/1980 | Immel et al. | 568/807 |
| 4,319,049 | 3/1982 | Rogier | 568/445 |
| 4,393,251 | 7/1983 | Broecker et al. | 568/811 |
| 4,456,737 | 6/1984 | DiDomenico, Jr. | 525/398 |
| 4,908,406 | 3/1990 | Mulhaupt et al. | 525/64 |

FOREIGN PATENT DOCUMENTS

| 0 338 830 | 10/1989 | European Pat. Off. |
| 1300301 | 10/1969 | Germany . |
| 50-27892 | 3/1975 | Japan . |
| 50-28595 | 3/1975 | Japan . |
| 2-274715 | 11/1990 | Japan . |
| 463782 | 11/1968 | Switzerland . |
| 989760 | 4/1965 | United Kingdom . |
| 1199803 | 7/1970 | United Kingdom . |

OTHER PUBLICATIONS

Nakamura et al., Article: "Polyurethanes with a New Diol Segment", Jun. 11, 1990, vol. 23, No. 12, pp. 3032–3035, Published in the American Chemical Society.

*Primary Examiner*—Rabon Sergent
*Attorney, Agent, or Firm*—Sughrue, Mion, Zinn, Macpeak & Seas, PLLC

[57] ABSTRACT

A polyester or polyurethane polymer having a repeating unit represented by the following formula (1):

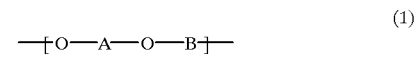

wherein A is a polyol compound residue represented by the following formula (2) or formula (3):

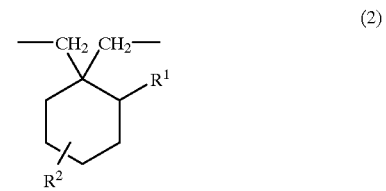

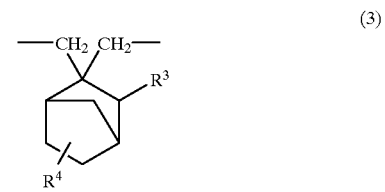

wherein $R^1$ and $R^3$ each individually represents an alkyl group having from 1 to 4 carbon atoms, and $R^2$ and $R^4$ each individually represents a hydrogen atom or a methyl group; and B is represented by the following formula (4) or formula (5):

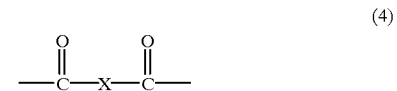

wherein X represents an alkylene, cycloalkylene, arylene or arylalkylene group having from 1 to 12 carbon atoms;

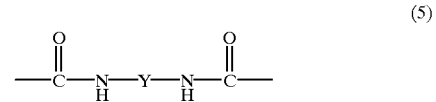

wherein Y represents an alkylene, cycloalkylene, arylene or arylalkylene group having from 1 to 12 carbon atoms.

16 Claims, No Drawings

6,069,222

POLYESTER AND POLYURETHANE DERIVED FROM SPECIFIC ALICYCLIC DIOLS

CROSS REFERENCE TO RELATED APPLICATIONS

This application is an application filed under 35 U.S.C. §111 (a) claiming benefit pursuant to 35 U.S.C. §119(e) (1) of the filing date of the Provisional Applications Ser. Nos. 60/078,672, 60/078,673 and 60/078,670 each filed Mar. 20, 1998 pursuant to 35 U.S.C. §111(b).

FIELD OF THE INVENTION

The present invention relates to a polyester or a polyurethane having a specific alicyclic diol residue, and more specifically, the present invention relates to a polyester or a polyurethane resin derived from diol compounds having specific alicyclic skeletons.

Use of the specified diols as starting materials for preparing a polyester or a polyurethane improves the heat resistance, water resistance, weatherability, transparency, etc., of the resulting polyester or polyurethane.

BACKGROUND OF THE INVENTION

Diol compounds are widely used as a starting material for preparing polyesters or polyurethanes. Among these, alicyclic diols such as 1,4-cyclohexanedimethanol (CHDM) have been used for the purpose of improving the performance of the polymer, for example, heat resistance, water resistance, weatherability, or transparency.

The polyester compound generally used as a molding material has an aromatic ring introduced into its structure. For example, polyethylene terephthalate (PET), polybutylene terephthalate (PBT) and the like are used. These polyester compounds are widely used as fibers, films, sheets or other molding materials because of their good mechanical and chemical properties. However, such typical polyester compounds comprising an aromatic dicarboxylic acid component and an aliphatic diol component also have crystalline properties. Therefore, despite their good heat resistance, the transparency of these polyester compounds is insufficient for use as films or sheets. PET has a relatively high ester group concentration and further is disadvantageous in that it has poor resistance to hydrolysis.

The above-described problems may be solved by replacing the entire or a part of the terephthalic acid component of the polyester having high crystallinity such as PET and PBT, with a dicarboxylic acid such as isophthalic acid or adipic acid, or by replacing the entire or a part of the diol component with another diol, for example, an aliphatic diol such as 1,4-cyclohexanedimethanol, 1,6-hexanediol, or a polyetherdiol such as polyethylene glycol, to thereby reduce the crystallinity. However, when these components are used, the polyester usually has a fairly low glass transition temperature Tg as compared with, for example, PET having a Tg of 69° C.

In other words, when these components are copolymerized, the crystallinity is reduced but the heat resistance is also greatly reduced and therefore, the molded article thus obtained has poor high temperature performance. In order to overcome this problem, the use of some alicyclic diols has been proposed. For example, JP-A-50–27892 (the term "JP-A" as used herein means an "unexamined published Japanese patent application") and JP-A-50–28595 propose a polyester using 1,1-cyclohexanedimethanol as the diol starting material, however, the heat resistance and transparency are insufficient.

Diol compounds also have been used for manufacturing polyurethanes in two ways. One is a method of directly reacting a diol with the isocyanate group (a diol used as a so-called "chain elongating agent"), and the other is a method of using a polyesterpolyol as the polyol component of the polyurethane.

It is known that a polyurethane obtained by reacting 4,4-methylenebis (phenylisocyanate) (MDI) which is one of the most commonly used diisocyanates, with a diol, for example, ethylene glycol, has a Tg of 139° C. and a polyurethane obtained by reaction with 1,4-butanediol has a Tg of 109° C. (see, *Polymer Handbook*, 4th ed.). Polyurethanes using a diol having a long chain, a polyetherpolyol or a polyesterpolyol are liable to have a low Tg. When these polyurethanes are used as plastics, the main chain thereof is deficient for applications requiring heat resistance, and a cross-linking component such as a trifunctional or greater functional polyisocyanate compound must be introduced at the molding step.

The present applicant has proposed a polyurethane (JP-A-2–274715) using a specific alicyclic polyol compound as a polyurethane having a high heat resistance as compared with the above-described polyurethanes.

The polyesterpolyol as a starting material of a polyurethane has conventionally been produced by condensing a glycol such as ethylene glycol, propylene glycol, 1,4-butanediol, 1,6-hexanediol or neopentyl glycol, or a polyol such as trimethylolpropane, glycerin or pentaerythritol, with a polycarboxylic acid such as adipic acid, maleic acid or phthalic acid.

The polyurethane obtained by polyaddition reacting the thus-produced polyesterpolyol with a polyisocyanate is used as a urethane foam, elastomer, RIM molded article, coating material, coating agent, fiber raw material or adhesive.

The polyurethane derived from the above-described polyesterpolyol has relatively good mechanical properties and heat resistance, however, it is deficient in that its hydrolysis resistance is inferior as compared with a polyether glycol or a polycarbonate diol and therefore, its application range is limited.

A diol having relatively large aliphatic groups has been proposed for increasing the hydrolysis resistance of polyurethane. A polyesterpolyol comprising an ethylene glycol or a diol such as 1,4-butanediol or 1,6-hexanediol as the diol component has crystalline properties and has a melting point higher than room temperature. Therefore, some difficulties may arise in reacting with a polyisocyanate.

As a result of extensive investigations, the present inventors have found that the above-described problems of the prior art can be solved by using a diol compound having a specific alicyclic skeleton as the diol component of a polyester or a polyurethane. The present invention has been accomplished based on this finding.

SUMMARY OF THE INVENTION

It is therefore an object of the present invention to provide a polyester or polyurethane having improved heat resistance, water resistance, weatherability and transparency.

The above object of the present invention has been achieved by providing a polymer having a repeating unit represented by the following formula (1):

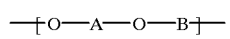

(1)

wherein A is a polyol compound residue represented by the following formula (2) or formula (3):

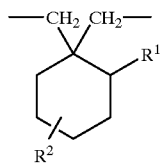

(2)

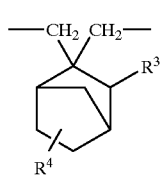

(3)

wherein $R^1$ and $R^3$ each individually represents an alkyl group having from 1 to 4 carbon atoms, and $R^2$ and $R^4$ each individually represents a hydrogen atom or a methyl group; and B is represented by the following formula (4) or formula (5):

(4)

wherein X represents an alkylene, cycloalkylene, arylene or arylalkylene group having from 1 to 12 carbon atoms;

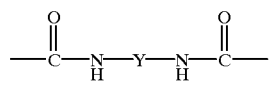

(5)

wherein Y represents an alkylene, cycloalkylene, arylene or arylalkylene group having from 1 to 12 carbon atoms.

DESCRIPTION OF THE PREFERRED EMBODIMENTS

The present invention is described in detail below.

The polyester or polyurethane of the present invention contains a repeating unit containing a diol residue derived from an alicyclic diol having a specific structure.

The alicyclic diol residue having a specific structure is represented by formula (2) or (3).

In formula (2), $R^1$ may be any alkyl group having from 1 to 4 carbon atoms but is preferably a methyl group. $R^2$ represents a hydrogen atom or a methyl group.

In formula (3), $R^3$ may be any alkyl group having from 1 to 4 carbon atoms but is preferably a methyl group. $R^4$ represents a hydrogen atom or a methyl group.

The alicyclic diol residue represented by formula (2) or (3) is derived from diol compounds having a 1,1-cyclohexanedimethanol skeleton with the 2-position being substituted by an alkyl group having from 1 to 4 carbon atoms or a 2,2-norbornanedimethanol skeleton with the 3-position being substituted by an alkyl group having from 1 to 4 carbon atoms.

Specific examples of the alicyclic diol having a specific structure include 2-methyl-1,1-cyclohexanedimethanol, 2-ethyl-1,1-cyclohexanedimethanol, 2-propyl-1,1-cyclohexanedimethanol, 2-butyl-1,1-cyclohexanedimethanol, 2,3-dimethyl-1,1-cyclohexanedimethanol, 2,4-dimethyl-1,1-cyclohexanedimethanol, 2,5-dimethyl-1,1-cyclohexanedimethanol, 2,6-dimethyl-1,1-cyclohexanedimethanol, 3-methyl-2,2-norbornanedimethanol, 3-ethyl-2,2-norbornanedimethanol, 3-propyl-2,2-norbornanedimethanol and 3-butyl-2,2-norbornanedimethanol.

The diol compound used as a starting material for the polyester of the present invention may be a diol compound which forms the diol residue represented by formula (2) or (3) alone, or may be a mixture thereof or a mixture with other diol compounds.

The ratio of the diol residue represented by formula (2) or (3) to all diol components in the polyester of the present invention may be freely selected, however, in order to enhance the effects of this invention, the content of the diol residue represented by formula (2) or (3) is generally from 5 to 100 mol %, preferably 20 mol % or more of all diol components contained in the polyester.

Other diol compounds which can be used in combination with the diol compound which forms the diol residue represented by formula (2) or (3) is not particularly limited as long as it is a diol compound generally usable in the preparation of polyesters. Specific examples thereof include linear aliphatic diols such as ethylene glycol, propylene glycol, trimethylene glycol, 1,4-butanediol, 1,5-pentanediol, 1,6-hexanediol, 3-methyl-1,5-pentanediol, 2-butyl-2-ethyl-1,3-propanediol and neopentyl glycol, alicyclic diols such as 1,4-cyclohexanedimethanol, hydrogenated bisphenol A and tricyclodecanedimethanol, aromatic diols such as bisphenol A and xylylenediol, and ether glycols such as diethylene glycol, triethylene glycol, polyethylene glycol and dipropylene glycol, however, the present invention is by no means limited thereto.

The polyester compound of the present invention can be obtained by condensing a diol compound represented by formula (8) or (9) with a dicarboxylic acid or a dicarboxylic acid derivative:

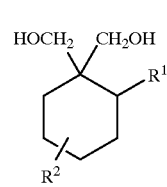

(8)

(wherein $R^1$ represents an alkyl group having from 1 to 4 carbon atoms, and $R^2$ represents a hydrogen atom or a methyl group)

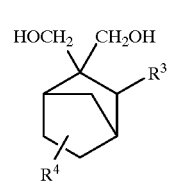

(9)

(wherein $R^3$ represents an alkyl group having from 1 to 4 carbon atoms, and $R^4$ represents a hydrogen atom or a methyl group).

In one embodiment, the polyester compound of the present invention comprises a structural unit represented by the following formula (6):

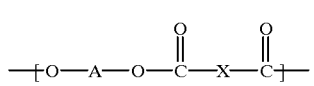
(6)

wherein A is a polyol compound residue represented by the following formula (2) or formula (3):

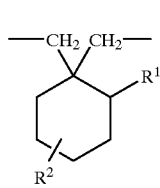
(2)

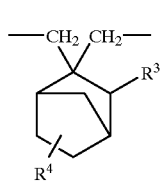
(3)

(wherein $R^1$ and $R^3$ each individually represents an alkyl group having from 1 to 4 carbon atoms, and $R^2$ and $R^4$ each individually represents a hydrogen atom or a methyl group) and X represents an alkylene, cycloalkylene, arylene or arylalkylene group having from 1 to 12 carbon atoms).

The kind of dicarboxylic acid used for preparing the polyester compound of the present invention is not particularly limited as long as it is a dicarboxylic acid generally used in the synthesis of polyesters.

Specific examples thereof include aromatic dicarboxylic acids such as terephthalic acid, isophthalic acid, phthalic acid, 2,6-naphthalenedicarboxylic acid and 4,4-biphenyldicarboxyic acid, aliphatic dicarboxylic acids such as oxalic acid, succinic acid, glutaric acid, adipic acid and sebacic acid, and alicyclic dicarboxylic acids such as 1,3-cyclohexanedicarboxylic acid, 1,4-cyclohexanedicarboxylic acid, hexahydrophthalic acid and tetrahydrophthalic acid. Among these, terephthalic acid, isophthalic acid and 2,6-naphthalenedicarboxylic acid are preferred.

The polyester of the present invention can be prepared by condensing the above-described dicarboxylic acid and the alicyclic diol compound having a specific structure. In this case, the dicarboxylic acid may be in the form of a free dicarboxylic acid, but additionally may be in the form of a dicarboxylic acid derivative such as a dicarboxylic acid ester, dicarboxylic acid anhydride or dicarboxylic acid chloride.

With respect to the mode for carrying out the polyester synthesis reaction in accordance with the present invention, a general polyester preparation method can be used.

More specifically, when a free dicarboxylic acid or a dicarboxylic acid anhydride is used, a direct esterification method may be used in which a diol compound and a dicarboxylic acid or a dicarboxylic acid anhydride are placed in a reaction vessel and heated to remove from the system by distillation water produced by the reaction. The reaction may proceed in the absence of a catalyst but may be accelerated using a catalyst. The esterification reaction is performed at a temperature of from 150 to 300° C., preferably from 180 to 300° C., preferably while distilling water.

The reaction pressure is usually atmospheric pressure, however, depending on the case, reduced pressure may be used to accelerate the distillation of water. Further, in order to obtain a high molecular weight polyester, a method of feeding a diol compound in an excess ratio based on the dicarboxylic acid and after the distillation of water, further distilling the excess diol at a high temperature under reduced pressure may be effectively used.

At this time, a catalyst is preferably used for accelerating the polycondensation reaction by the distillation of diol. The catalyst which can be used in the ester exchange reaction for obtaining a high molecular weight polyester may be a catalyst used in the polycondensation reaction for the synthesis of polyester. Examples thereof include titanium compounds such as titanium alkoxide, tin compounds such as tin oxide, antimony compounds such as antimony oxide, and carboxylates of zinc, lead, cerium, cobalt or manganese.

The polycondensation reaction by the distillation of diol is preferably performed at a temperature of from 150 to 350° C., more preferably from 200 to 300° C. The reaction may proceed under normal pressure but is preferably performed under reduced pressure for achieving efficient distillation of diol. A method of increasing the decompression degree as the reaction proceeds is particularly effective.

In the case of synthesizing the polyester by ester exchange of a dicarboxylic acid ester with a diol, a dicarboxylic acid ester, a diol and a catalyst are fed to a reaction vessel and the alcohol produced due to the reaction is removed from the system by distillation at a high temperature.

Examples of the dicarboxylic acid ester which can be used include a methyl ester, an ethyl ester, a propyl ester, a butyl ester and the like of a dicarboxylic acid. In view of easy performance of reaction and cost, a methyl ester is preferred.

In this case, the catalyst which can be used in the reaction includes a carboxylate, a carbonate, a hydroxide, an oxide and an alcoholate of a metal such as an alkali metal, an alkaline earth metal, zinc, lead, manganese, cobalt, tin, antimony or germanium. The reaction is performed at a temperature of from 120 to 300° C., preferably from 160 to 300° C. The reaction may proceed under atmospheric pressure but the reaction may also be performed under reduced pressure so as to accelerate the distillation of alcohol.

Similar to the direct esterification reaction, a method of feeding a diol compound in an excess ratio to a dicarboxylic acid and after distillation of alcohol, further distilling the excess diol under reduced pressure at a high temperature is effective for obtaining a polyester having a high molecular weight.

When a polyester is prepared by the reaction of a dicarboxylic acid chloride with a diol, the reaction may be performed by a method of distilling hydrochloric acid produced at a high temperature without using a solvent or a method of distilling hydrochloric acid produced at a low temperature in the presence of a solvent or neutralizing it with a basic compound.

In this case, the reaction temperature is from room temperature to 280° C., preferably from room temperature to 250° C. In the case of using a solvent, the solvent is not particularly limited as it does not react with the substrate, and examples of the solvent which can be used include halogenated hydrocarbons such as dichloromethane, chloroform and tetrachloroethane, aromatic hydrocarbons such as benzene, toluene and xylene, ethers such as tetrahydrofuran, dioxane and dimethoxyethane, ketones such as acetone, methyl ethyl ketone, methyl isobutyl ketone and cyclohexanone, esters such as ethyl acetate and butyl acetate, nitrites such as acetonitrile, and amides such as N,N-dimethylacetamide and N-methyl-2-pyrrolidone.

When the reaction is performed at a low temperature, a basic compound is preferably added to the system to neutralize hydrochloric acid produced during the reaction and to accelerate the reaction. Examples of the basic compound include tertiary amines such as triethylamine, and alkali metal salts such as sodium acetate and sodium carbonate. A basic solvent such as N,N-dimethylacetamide and N-methylpyrrolidone can serve as the basic compound and as the solvent at the same time.

The polyester of the present invention preferably has a weight average molecular weight of 3,000 or more when it is used independently for making a molded article, film, sheet, coating agent, etc. If the molecular weight is less than the above range, the effect of the present invention is not fully obtained and also a substantially useful molded article cannot be obtained. The Mw is more preferably 5,000 or more. But when the polyester of the present invention is used as a raw material for a polyurethane described below or a polyester, a comparatively low molecular weight is suitable.

PET is inherently crystalline and therefore, when it is gradually cooled after once melted or is allowed to stand at a temperature higher than Tg, white turbidity occurs due to the crystallization. Accordingly, in order to maintain transparency, it is necessary to use conditions or means for preventing crystallization.

On the other hand, the polyester compound of the present invention hardly undergoes crystallization, and even if it is left standing at a temperature higher than Tg, white turbidity does not occur. The cyclohexane structure at the side chain of the specified diol residue of the present invention is considered to be effective in preventing crystallization of the polyester. Moreover, the alkyl group at the 2-position of cyclohexane ring of the diol residue may also promote this effect.

With regard to molecular structure, the molecular chain of the polyester compound of the present invention is considered to be somewhat more rigid than that of PET. Due to this, and despite its fairly low crystallinity, transparency, heat resistance and water resistance can be greatly improved while sufficiently maintaining the physical properties of a conventional polyester such as PET.

The specific alicyclic diol residue is also effective in enhancing the performance of the polyurethane.

In another embodiment, the polyurethane compound of the present invention comprises a repeating unit represented by the following formula (7):

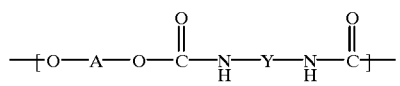

(wherein A is a polyol compound residue represented by the following formula (2) or formula (3):

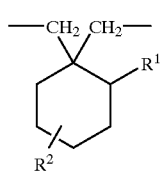

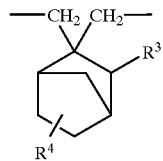

(wherein $R^1$ and $R^3$ each individually represents an alkyl group having from 1 to 4 carbon atoms, and $R^2$ and $R^4$ each individually represents a hydrogen atom or a methyl group) and Y represents an alkylene, cycloalkylene, arylene or arylalkylene group having from 1 to 12 carbon atoms).

The polyurethane represented by formula (7) of the present invention is a polyurethane containing a repeating unit containing a diol residue derived from an alicyclic diol compound having a specific structure as described above. In formula (7), Y is a diisocyanate compound residue, and examples thereof include an alkylene group, a cycloalkylene group, an arylene group and an arylalkylene group having from 1 to 12 carbon atoms.

The kind of polyisocyanate for use in preparing the polyurethane of the present invention is not particularly limited, and a polyisocyanate commonly usable in the synthesis of polyurethanes may be used.

Specific examples thereof include 4,4-diphenylmethane diisocyanate (MDI), polymeric MDI, hydrogenated MDI, tolylene diisocyanate (TDI), 1,5-naphthalene diisocyanate (NDI), hexamethylene diisocyanate (HDI), xylylene diisocyanate (XDI), 4,4'-dicyclohexylmethane diisocyanate (HMDI), isophorone diisocyanate (IPDI) and tetramethylxylylene diisocyanate (TMXDI).

The polyurethane of the present invention may contain a diol residue derived from another diol compound, in addition to the residue derived from the above-described specific alicyclic diol. The other diol residue is not particularly limited as long as it is a diol residue derived from a polyol compound capable of reacting with a polyisocyanate compound generally used in the preparation of polyurethanes. Specific examples of the other polyol compound include linear aliphatic diols such as ethylene glycol, propylene glycol, trimethylene glycol, 1,4-butanediol, 1,6-hexanediol and neopentyl glycol, alicyclic diols such as 1,4-cyclohexanedimethanol, hydrogenated bisphenol A and tricyclodecanedimethanol, aromatic diols such as bisphenol A and xylylenediol, (poly)ether glycols such as diethylene glycol, triethylene glycol, polyethylene glycol, polypropylene glycol and polytetramethylene glycol, polyesterpolyols such as polyethylene adipate, polytetramethylene adipate, polyhexamethylene adipate, polyneopentylene adipate and polycaprolactam, and diol residues such as polycarbonate diol and polybutadiene polyol, however, the present invention is by no means limited thereto. The ratio between the specific alicyclic diol residue and the other diol components may be freely selected, however, in order to enhance the effects of the present invention, the content of the alicyclic diol residue represented by formula (2) or (3) is generally from 5 to 100 mol %, preferably from 10 to 100 mol % of all diol components contained in the polyurethane.

The polyurethane compound of the present invention can be obtained by the polyaddition reaction of polyol compounds including the alicyclic diol compound represented by the formula (8) or (9) to a polyisocyanate compound.

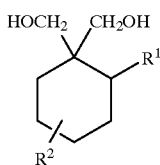

(8)

(wherein R¹ represents an alkyl group having from 1 to 4 carbon atoms, and R² represents a hydrogen atom or a methyl group)

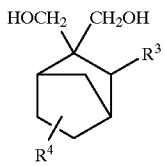

(9)

(wherein R³ represents an alkyl group having from 1 to 4 carbon atoms, and R⁴ represents a hydrogen atom or a methyl group).

With respect to the mode for carrying out the polyurethane synthesis reaction in the present invention, a general polyurethane preparation process may be used.

More specifically, a method of reacting a polyisocyanate with a diol compound in the presence or absence of a catalyst may be used. The catalyst may be a catalyst usually used in the polyaddition reaction for synthesizing a polyurethane in general, such as an organic amine compound or an organotin compound.

If desired, another chain elongating agent or cross-linking agent such as a polyol compound or polyamine compound may be added to further change the polymerization degree of the polymer.

The polyurethane of the present invention preferably has a weight average molecular weight (Mw) of 3,000 or more. If the molecular weight is less than the above range, the effect of the present invention is not obtained and also a substantially useful molded article cannot be obtained. The Mw is more preferably 5,000 or more.

The polyurethane of the present invention has fairly higher heat resistance as compared with conventional polyurethanes, and some polyurethanes thus obtained may have a Tg exceeding 170° C.

The specified alicyclic diol of the present invention can also be used to prepare polyesterpolyol starting material for promoting the performance of the polyurethane.

The polyurethane prepared from a polyesterpolyol containing the above-described specific alicyclic diol residue as a diol starting material has greatly improved hydrolysis resistance as compared with a polyurethane prepared from a conventional polyesterpolyol used as a diol starting material.

The polyesterpolyol for use in preparing the polyurethane of the present invention does not crystallize due to the specific alicyclic diol residue introduced thereinto and is a liquid at room temperature. This liquid polyesterpolyol is advantageous in that in synthesizing a polyurethane by reaction with an isocyanate, the step of forming a polyurethane is simplified as compared with the use of a polyesterpolyol having a high melting point and which is a solid at room temperature.

The diol residue in the polyesterpolyol for use in the polyurethane of the present invention may contain, in addition to the residue derived from the above-described specific alicyclic diol, a polyol residue derived from another bifunctional or greater functional polyol compound. The polyol residue other than the specific alicyclic diol residue is not particularly limited as long as it is a polyol residue derived from a polyol compound capable of reacting with a polyisocyanate compound generally used in the preparation of polyurethanes. Specific examples thereof include linear aliphatic diols such as ethylene glycol, propylene glycol, trimethylene glycol, 1,4-butanediol, 1,6-hexanediol and neopentyl glycol, alicyclic diols such as 1,4-cyclohexanedimethanol, hydrogenated bisphenol A and tricyclodecanedimethanol, aromatic diols such as bisphenol A and xylylenediol, (poly)ether glycols such as diethylene glycol, triethylene glycol, polyethylene glycol, polypropylene glycol and polytetramethylene glycol, and polyol residues such as trimethylolpropane, trimethylolethane, glycerin, hexanetriol and pentaerythritol, however, the present invention is by no means limited thereto.

The ratio of the specific alicyclic diol residue to all diol components in the polyesterpolyol for use in the present invention may be freely selected, however, for enhancing the effect of the present invention, the content of the specific alicyclic diol residue represented by formula (2) or (3) is preferably made larger and is generally from 10 to 100 mol %, preferably from 20 to 100 mol % of all diol components contained in the polyurethane.

The kind of the dicarboxylic acid residue in the specific polyesterpolyol for use in the polyurethane compound of the present invention is not particularly limited and may be a dicarboxylic acid residue usually used in a polyesterpolyol.

Specific examples of the compounds from which the dicarboxylic acid residue is derived include aliphatic dicarboxylic acids such as oxalic acid, succinic acid, glutaric acid, adipic acid, azelaic acid and sebacic acid, alicyclic dicarboxylics acid such as 1,3-cyclohexanedicarboxylic acid, 1,4-cyclohexanedicarboxylic acid, hexahydrophthalic acid, tetrahydrophthalic acid and dimeric acid, and other dicarboxylic acids such as phthalic acid and maleic acid.

The polyurethane of the present invention may be prepared by polyaddition reacting a polyesterpolyol compound containing the above-described alicyclic diol residue with a polyisocyanate compound. In this case, the polyesterpolyol for use in the present invention preferably has a hydroxyl group value of from 10 to 200. In the case of a polyesterpolyol using a diol compound only as the polyol starting material, hydroxyl groups are usually present at both terminals of the polyesterpolyol and the number of hydroxyl groups per one polymer molecule is almost 2. However, a polyesterpolyol having a bifunctional or greater functional hydroxyl group on average per one polymer molecule can also be synthesized using a trifunctional or greater functional polyol compound as the sole or a part of the polyol starting material. In order to render a hydroxyl group present at the terminal of a polyesterpolyol, the polyesterpolyol is synthesized such that the total molar equivalent of the hydroxyl groups in the polyol starting material is greater than the molar equivalent of the dicarboxylic acid starting material. In the case where a polyurethane is prepared by reacting with a polyisocyanate, if the hydroxyl group value is less than 10, the hydroxyl group concentration is too low to achieve a substantially effective urethane formation rate and the resulting polymer has inferior physical properties.

Furthermore, a polyesterpolyol having a low hydroxyl group value usually has a high molecular weight and is highly viscous, and accordingly, its use in a practical reaction is cumbersome. If the hydroxyl group value exceeds 200, the urethane thus prepared has a functional group concentration that is too high and the effect of the present invention is difficult to achieve.

The polyurethane may be synthesized in a single stage such that a chain elongating agent or cross-linking agent and the above-described polyesterpolyol and polyisocyanate compounds are simultaneously reacted, or may be synthesized in two stages such that the polyesterpolyol and polyisocyanate compounds are first reacted to prepare a polyisocyanate-terminal oligomer, and then the polyisocyanate oligomer is reacted with a chain elongating agent or cross-linking agent.

The polyol or polyamine compound as a chain elongating agent or cross-linking agent, which can be used with the polyesterpolyol containing the above-described specified diol residue in the polyurethane of the present invention is not particularly limited as long as it is a compound generally used in preparing polyurethanes. Specific examples of the polyol compound include linear aliphatic diols such as ethylene glycol, propylene glycol, trimethylene glycol, 1,4-butanediol, 1,6-hexanediol and neopentyl glycol, alicyclic diols such as 1,4-cyclohexanedimethanol, hydrogenated bisphenol A and tricyclodecanedimethanol, aromatic diols such as bisphenol A, xylylenediol and hydroquinone diethylol ether, (poly)ether glycols such as diethylene glycol, triethylene glycol, polyethylene glycol, polypropylene glycol and polytetramethylene glycol, polyols such as trimethylolpropane, trimethylolethane, glycerin, hexanetriol, pentaerythritol and sorbitol, polyesterpolyols such as polyethylene adipate and polytetramethylene adipate, polycaprolactone polyol, polycarbonate polyol and polybutadiene polyol.

Specific examples of the polyamine compound include aromatic Polyamine compounds such as 3,3'-dichloro-4,4'-diamino-diphenylmethane (MOCA), aliphatic polyamine compounds such as ethylenediamine, and OH-containing amines such as monoethanolamine and diethanolamine.

The mixing ratio of the polyisocyanate and the polyesterpolyol in the synthesis of a polyurethane is usually adjusted so that the final ratio of the amount of isocyanate groups in the polyisocyanate compound used in the reaction, to the amount of the functional groups reacted therewith, is almost 1. In other words, the mixing ratio of respective starting materials is determined so that the total molar equivalent of the hydroxyl groups for reacting with the NCO group in the polyisocyanate compound and the hydroxyl groups or amino groups in the chain elongating agent or cross-linking agent, to the total molar equivalent of the isocyanate groups in the polyisocyanate compound is almost 1. For the purpose of improving mechanical properties, the ratio of the isocyanate group to the functional group reacted therewith such as a polyol, may be shifted from 1 in some cases.

In the case where the polyol content in the polyurethane of the present invention is entirely a polyesterpolyol represented by formula (1) and further, even in the case where the polyurethane contains various polyol or polyamine components as described above, the polyesterpolyol represented by formula (1) preferably accounts for 50 wt % or more of the total polyol content.

EXAMPLES

The present invention is described in greater detail below, however, the present invention should not be construed as being limited thereto.
(Measurement of Molecular Weight by GPC)

The measurement of molecular weight by GPC was performed under the following conditions:

Column: SHODEX KF-806M×2 and KF-807, manufactured by Showa Denko KK
Solvent: chloroform 1.2 ml/min
Temperature: 40° C.
Detector: UV detector
(Measurement Conditions for $^1$H-NMR and $^{13}$C-NMR Spectra)

$^1$H-NMR was measured using an appropriate deuterized solvent (polyester:CDC13, polyurethane:DMSO-d6) and tetramethylsilane as a standard reference material by means of a Model JNM-EX400 (400 MHz) made by Nippon Denshi KK. $^{13}$C-NMR was measured by decoupling $^1$H.
(Measurement of IR Spectrum)

The IR spectrum was measured according to the KBr briquette method by means of an infrared spectroscope, FT/IR 7300 made by Nippon Bunko KK.
(Measurement of DSC)

The DSC was measured by a DSC7 made by Perkin-Elmer.

The quantity of heat was measured by elevating the temperature from 30° C. to 300° C. at a rate of 10° C./min, then lowering to 30° C. at a rate of 10° C./min, and again elevating to 300° C. at a rate of 10° C./min. The glass transition temperature (Tg) of the polymer was determined based on the change in the quantity of heat at the time of the second temperature elevation.
(Acid Value and Hydroxyl Group Value)

The acid value and hydroxyl group value were measured according to JIS K-0070.

Example 1

Polyester of Terephthalic Acid and 2-Methyl-1,1-cyclohexanedimethanol:

To a 30 ml-volume flask were added 1.582 g (10.0 mmol) of 2-methyl-1,1-cyclohexanedimethanol and 5 ml of dry N-methyl-2-pyrrolidone, and 5 ml of dry N-methylpyrrolidone solution containing 2.030 g (10.0 mmol) of terephthalic acid chloride was added thereto at room temperature. The resulting solution was stirred by a magnetic stirrer at room temperature.

When heat was no longer generated and the contents began to solidify, the flask was dipped in an oil bath and stirred while heating and the reaction was performed at 180° C. for 2 hours.

After the reaction, the resulting solution was added dropwise into 1 liter of methanol under vigorous stirring to precipitate a polymer. The white polymer thus obtained was left standing overnight, filtered, washed with methanol and dried under vacuum.

The $^1$H-NMR, $^{13}$C-NMR spectrum and IR spectrum of the polymer thus obtained were measured. The spectrum data and assignments are shown below.
$^1$H-NMR (δ, ppm, CDCl$_3$):
1.05 (d, 3H, —CH(C$\underline{H}_3$)—)
1.41–1.88 (m, 9H, C(cyclohexane)—H)
4.37–4.56 (m, 4H, —CH$_2$O—)
8.01–8.07 (m, 4H, C(arom.)—H)
$^{13}$C-NMR (δ, ppm, CDCl$_3$):
16.1 (—CH($\underline{C}$H$_3$)—)
21.3, 24.6, 29.6, 30.3, 34.4, 40.1 (C(cyclohexane))
64.9, 68.5 (—CH$_2$O—)
129.6, 133.9 (C(arom.))
165.6 (—OC(O)—)
IR (cm$^{-1}$, KBr briquette method):
1724 ($v_{C=O}$)
1270 ($v_{X(O)—O}$)

1119, 1101 ($\nu_{C-O}$)

1018, 730 ($\delta$(arom.))

From these results, the compound obtained was identified as the polyester of terephthalic acid and 2-methyl-1,1-cyclohexanedimethanol.

The molecular weight of this polymer was measured by GPC and Tg was measured by DSC, and as a result, the polymer was found to have a number average molecular weight Mn of 2,430, a weight average molecular weight Mw of 8,720 and a Tg of 95° C.

Example 2

Polyester of Terephthalic Acid and 3-Methyl-2,2-norbornanedimethanol:

A white polymer was obtained using the same process as in Example 1, except for using 1.703 g (10 mmol) of 3-methyl-2,2-norbornanedimethanol in place of 2-methyl-1,1-cyclohexanedimethanol in Example 1.

The $^1$H-NMR, $^{13}$C-NMR and IR spectrum data and assignments of the polymer thus obtained are shown below.

$^1$H-NMR ($\delta$, ppm, CDCl$_3$):

1.05 (d, 3H, —CH(C$\underline{H}_3$)—)

1.24–1.97 m, 2.30S (9H, C(norbornane)—H)

4.34–4.50 (m, 4H, —CH$_2$O—)

8.04 (s, 4H, C(arom.)—H)

$^{13}$C-NMR ($\delta$, ppm, CDCl$_3$):

15.8 (—CH($\underline{C}$H$_3$)—)

23.8, 29.2, 35.2, 42.4, 45.2, 45.3, 47.1 (C(norbornane))

65.2, 68.1 (—CH$_2$O—)

129.6, 134.0 (C(arom.))

165.6 (—OC(O)—)

IR (cm$^{-1}$, KBr briquette method):

1721 ($\nu_{C=O}$)

1270 ($\nu_{C(O)-O}$)

1119, 1102 ($\nu_{C-O}$)

1018, 730 ($\delta$(arom.))

From these results, the compound thus obtained was identified as the polyester of terephthalic acid and 3-methyl-2,2-norbornanedimethanol.

The molecular weight of this polymer was measured by GPC and Tg was measured by DSC, and as a result, the polymer was found to have a number average molecular weight Mn of 2,830, a weight average molecular weight Mw of 10,190 and a Tg of 118° C.

Example 3

Polyester of Terephthalic Acid and 2,4-Dimethyl-1,1-cyclohexanedimethanol:

A white polymer was obtained using the same process as in Example 1, except for using 1.723 g (10 mmol) of 2,4-dimethyl-1,1-cyclohexanedimethanol in place of 2-methyl-1,1-cyclohexanedimethanol in Example 1.

The $^1$H-NMR, $^{13}$C-NMR and IR spectrum data and assignments of the polymer obtained are shown below.

$^1$H-NMR ($\delta$, ppm, CDCl$_3$):

0.94 d, 1.03 d (6H, —CH(CH$_3$)—)

1.01–1.17 m, 1.51–1.63 m, 1.88–1.97 m (8H, C(cyclohexane)—H)

4.43–4.59 (m, 4H, —CH$_2$O—)

8.05–8.06 (m, 4H, C(arom.)—H)

$^{13}$C-NMR ($\delta$, ppm, CDCl$_3$):

16.6, 22.3 (—CH($\underline{C}$H$_3$)—)

30.0, 31.4, 32.8, 36.0, 39.7, 39.9 (C(cyclohexane))

63.9, 69.6 (—CH$_2$O—)

129.6, 133.9 (C(arom.))

165.6 (—OC(O)—)

IR (cm$^{-1}$, KBr briquette method):

1724 ($\nu_{C=O}$)

1267 ($\nu_{C(O)-O}$)

1117, 1101 ($\nu_{C-O}$)

1018, 729 ($\delta$(arom.))

From these results, the compound obtained was identified as the polyester of terephthalic acid and 2,4-dimethyl-1,1-cyclohexanedimethanol.

The molecular weight of this polymer was measured by GPC and Tg was measured by DSC, and as a result, the polymer was found to have a number average molecular weight Mn of 2,350, a weight average molecular weight Mw of 5,870 and a Tg of 104° C.

Example 4

Polyester of Isophthalic Acid and 2-Methyl-1,1-cyclohexanedimethanol:

A white polymer was obtained using the same process as in Example 1, except for using 2.030 g (10 mmol) of isophthalic acid chloride in place of terephthalic acid chloride in Example 1.

The $^1$H-NMR, $^{13}$C-NMR and IR spectrum data and assignments of the polymer thus obtained are shown below.

$^1$H-NMR ($\delta$, ppm, CDCl$_3$):

1.06 (d, 3H, —CH(C$\underline{H}_3$)—)

1.39, 1.89 (m, 9H, C(cyclohexane)—H)

4.37–4.56 (m, 4H, —CH$_2$O—)

7.46 t, 8.15–8.18 m, 8.62 d (4H, C(arom.)—H)

$^{13}$C-NMR ($\delta$, ppm, CDCl$_3$):

16.1 (—CH(CH$_3$)—)

21.3, 24.5, 29.4, 30.2, 34.3, 40.1 (C(cyclohexane))

65.0, 68.4 (—CH$_2$O—)

128.8, 130.6, 133.8 (C(arom.))

165.6 (—OC(O)—)

IR (cm$^{-1}$, KBr briquette method):

1726 ($\nu_{C=O}$)

1304, 1231 ($\nu_{C(O)-O}$)

1134, 1075 ($\nu_{C-O}$)

1000, 977, 728 ($\delta$(arom.))

From these results, the compound obtained was identified as the polyester of isophthalic acid and 2-methyl-1,1-cyclohexanedimethanol.

The molecular weight of this polymer was measured by GPC and Tg was measured by DSC, and as a result, the polymer was found to have a number average molecular weight Mn of 3,770, a weight average molecular weight Mw of 11,130 and a Tg of 90° C.

Example 5

Polyester of Terephthalic Acid with 2-Methyl-1,1-cyclohexanedimethanol and Ethylene Glycol:

To a 2 l-volume separable flask equipped with a stirrer and a fractionating tower were added 776.7 g (4.0 mol) of dimethyl terephthalate, 506.4 g (3.2 mol) of 2-methyl-1,1-cyclohexanedimethanol, 422.1 g (6.8 mol) of ethylene glycol and 175 mg (0.8 mmol) of zinc acetate, and the volume of the flask was displaced by nitrogen.

After thoroughly dissolving the contents by heating the flask at 100° C. while stirring, the temperature was elevated to 180° C. to remove the methanol produced by distillation. At the time when the distillation rate of methanol decreased, the reaction temperature was elevated to 200° C. and the reaction was continued until the distillation of methanol was completed.

Thereafter, the reaction solution was once cooled to room temperature, 199 mg (0.8 mmol) of dibutyltin oxide was added thereto and after displacing with nitrogen, the temperature was elevated to 230° C. to distill ethylene glycol under atmospheric pressure. At the time when the distillation rate decreased, the pressure in the system was gradually reduced and accompanying it, the reaction temperature was gradually elevated to accelerate the removal of ethylene glycol by distillation. The reaction was carried out finally at a reaction temperature of from 270 to 280° C. and 0.4 mmHg for about one hour and terminated when no additional matter was being removed by distillation. As a result, a pale brown transparent solid substance was obtained.

The $^1$H-NMR, $^{13}$C-NMR and IR spectrum data and assignments of the polymer thus obtained are shown below.
$^1$H-NMR (δ, ppm, CDCl$_3$):

1.06 (d, —CH(CH$_3$)—)

1.41–1.89 (m, C(cyclohexane)—H)

4.38–4.57 (m, C (cyclohexane)—CH$_2$O—)

4.70 (s, —O—CH$_2$—CH$_2$O—)

8.05–8.12 (m, C(arom.)—H)

$^{13}$C-NMR (δ, ppm, CDCl$_3$):

16.1 (—CH(CH$_3$)—)

21.3, 24.5, 29.5, 30.3, 34.4, 40.1 (C(cyclohexane))

63.0 (—O—CH$_2$—CH$_2$O—)

65.0, 68.5, 68.6 (C(cyclohexane)—CH$_2$O—)

129.6, 129.7, 133.6–134.1 (C(arom.))

165.5–165.6 (—OC(O)—)

IR (cm$^{-1}$, KBr briquette method):

1722 ($\nu_{C=O}$)

1270 ($\nu_{C(O)-O}$)

1119, 1098 ($\nu_{C-O}$)

1017, 727 (δ(arom.))

From these results, the compound obtained was identified as the polyester of terephthalic acid with 2-methyl-1,1-cyclohexanedimethanol and ethylene glycol. Furthermore, from the integration ratio in $^1$H-NMR, the molar ratio of 2-methyl-1,1-cyclohexanedimethanol to ethylene glycol in the polymer was determined to be 74:26.

The molecular weight of this polymer was measured by GPC and Tg was measured by DSC, and as a result, the polymer was found to have a number average molecular weight Mn of 6,940, a weight average molecular weight Mw of 24,170 and a Tg of 93° C.

Example 6

Polyester of Isophthalic Acid with 2-Methyl-1,1-cyclohexanedimethanol and Ethylene Glycol:

A pale brown transparent solid substance was obtained using the same process as in Example 5, except for using 776.7 g (4.0 mol) of dimethyl isophthalate in place of dimethyl terephthalate in Example 5.

The $^1$H-NMR, $^{13}$C-NMR and IR spectrum data and assignments of the polymer thus obtained are shown below.
$^1$H-NMR (δ, ppm, CDCl$_3$):

1.06 (d, —CH(CH$_3$)—)

1.39–1.83 (m, C(cyclohexane)—H)

4.36–4.56 (m, C(cyclohexane)—CH$_2$O—)

4.70 (s, —O—CH$_2$—CH$_2$O—)

7.45–7.50 m, 8.17–8.23 m, 8.62–8.67 m (C(arom.)—H)

$^{13}$C-NMR (δ, ppm, CDCl$_3$):

16.1 (—CH(CH$_3$)—)

21.3, 24.5, 29.6, 30.2, 34.5, 40.1 (C(cyclohexane))

63.0 (—O—CH$_2$—CH$_2$O—)

65.0, 68.4 (C(cyclohexane)—CH$_2$O—)

128.8, 130.3–131.0, 133.8–134.1 (C(arom.))

165.4–165.5 (—OC(O)—)

IR (cm$^{-1}$, KBr briquette method)

1726 ($\nu_{C=O}$)

1307, 1219 ($\nu_{C(O)-O}$)

1131, 1073 ($\nu_{C-O}$)

995, 972, 725 (δ(arom.))

From these results, the compound obtained was identified as the polyester of isophthalic acid with 2-methyl-1,1-cyclohexanedimethanol and ethylene glycol. Furthermore, from the integration ratio in $^1$H-NMR, the molar ratio of 2-methyl-1,1-cyclohexanedimethanol to ethylene glycol in the polymer was determined to be 72:28.

The molecular weight of this polymer was measured by GPC and Tg was measured by DSC, and as a result, the polymer was found to have a number average molecular weight Mn of 6,890, a weight average molecular weight Mw of 33,600 and a Tg of 82° C.

Comparative Example 1

Polyester (PET) of Terephthalic Acid with Ethylene glycol:

A pale white brown polymer was obtained using the same reaction as in Example 5, except for using 620.7 g (10 mol) of ethylene glycol alone in place of 2-methyl-1,1-cyclohexanedimethanol and ethylene glycol in Example 5.

The molecular weight of this polymer was measured by GPC, and as a result, the polymer was found to have a number average molecular weight Mn of 8,120 and a weight average molecular weight Mw of 37,200.

(Ray Transmittance and Heat Resistance)

Each of the polymers obtained in Examples 5 and 6 and Comparative Example 1 was pulverized. The powder obtained was placed between two glass plates with a 3 mm-thick spacer therebetween, melted at 260° C. in a nitrogen atmosphere and then cooled at a rate of about 10° C./min to solidify the polymer. The polymer sheet thus obtained was cut into a 50 mm square and used as a sample piece.

The sample pieces were examined with respect to appearance, total ray transmittance (JIS K-7105) and heating loss (24 hours) in a 1% aqueous NaOH solution at 95° C. The results thus obtained are shown in Table 1.

TABLE 1

| | Appearance | Total Ray Transmittance | Loss in Weight on Heating |
|---|---|---|---|
| Example 5 | transparent | 90% | 0.8% |
| Example 6 | transparent | 92% | 0.9% |
| Comparative Example 1 | whitely turbid | 18% | 7.8% |

Example 7

Polyurethane of 4,4-Methylenebisphenyl Isocyanate (MDI) with 2-Methyl-1,1-Cyclohexanedimethanol.

In a 50 ml-volume flask, 582 g (10.0 mmol) of 2-methyl-1,1-cyclohexanedimethanol was dissolved in 10 ml of dry tetrahydrofuran (THF), and thereto, 10 ml of a dry THF solution containing 2.030 (10.0 mmol) of purified MDI was added at room temperature in a nitrogen atmosphere. The resulting solution was stirred at room temperature by means of a magnetic stirrer. When heat was no longer generated, the reaction vessel was dipped in an oil bath and the reaction was carried out at 60° C. for 5 hours.

After the reaction, the resulting viscous solution was added dropwise to 1 liter of hexane under vigorous stirring to precipitate a polymer. The white polymer thus obtained was left standing overnight, filtered, washed with hexane, pulverized and then dried under vacuum. As a result, a white polymer was obtained.

The $^1$H-NMR, $^{13}$C-NMR spectrum and IR spectrum of the polymer obtained were measured. The spectrum data and assignments are shown below.

$^1$H-NMR (δ, ppm, DMSO-d6):

0.91 (d,—CH(C$\underline{H}_3$)—)

1.23–1.77 (m, C(cyclohexane)—H)

3.78 s (arom.—CH$_2$—arom.)

4.03–4.23 (m, —CH$_2$O—)

7.08 d, 7.38 d (m, C(arom.)—H)

9.52 s (—NH—)

$^{13}$C-NMR (δ, ppm, DMSO-d6, *: undetected due to overlapping with solvent signal):

15.6 (—CH($\underline{C}$H$_3$)—)

22.0, 24.2, 28.2, 29.7, 32.9, ca40* (C(cyclohexane))

39.6 (arom.—$\underline{C}$H$_2$—arom.)

63.3, 66.7 (—CH$_2$O—)

118.3, 128.8, 135.4, 137.0 (C(arom.))

153.5 (—OC(O)—)

IR (cm$^{-1}$, KBr briquette method):

3300, 1712, 1597, 1519

From these results, the compound thus obtained was identified to be the polyurethane of MDI with 2-methyl-1,1-cyclohexanedimethanol.

The molecular weight of this polymer was measured by GPC and the polymer was found to have a number average molecular weight Mn of 14,300 and a weight average molecular weight Mw of 36,200.

Furthermore, the Tg of this polymer was 147° C. as determined by DSC measurement.

Example 8
Polyurethane of MDI with 3-Methyl-2,2-Norbornanedimethanol

A white polymer was obtained using the same process as in Example 7, except for using 1.703 g (10 mmol) of 3-methyl-2,2-norbornanedimethanol in place of 2-methyl-1,1-cyclohexanedimethanol of Example 7.

The $^1$H-NMR, $^{13}$C-NMR and IR spectrum data and assignments of the compound thus obtained are shown below.

$^1$H-NMR (δ, ppm, DMSO-d6):

0.95 (d, —CH(C$\underline{H}_3$)—)

1.09–1.82 m, 2.10 s (C(norbornane)—H)

3.78 s (arom.—CH$_2$—arom.)

3.98–4.19 (m, —CH$_2$O—)

7.07 d, 7.37 d (m, C(arom.)—H)

9.48 s (—NH—)

$^{13}$C-NMR (δ, ppm, DMSO-d6, *: undetected due to overlapping with solvent signal):

15.2 (—CH($\underline{C}$H$_3$)—)

23.2, 28.7, 34.6, ca40*, 41.6, 44.3, 44.5 (C(norbornane))

ca40* (arom.—$\underline{C}$H$_2$—arom.)

63.8, 66.6 (—CH$_2$O—)

118.3, 128.8, 135.4, 137.1 (C(arom.))

153.5, 153.6 (—OC(O)—)

IR (cm$^{-1}$, KBr briquette method):

3300, 1710, 1595, 1520

From these results, the compound obtained was identified as the polyurethane of MDI with 3-methyl-2,2-norbornanedimethanol.

The molecular weight of this polymer was measured by GPC and was found to have a number average molecular weight Mn of 12,800 and a weight average molecular weight Mw of 41,000.

Furthermore, the Tg of this polymer was 175° C. as determined by DSC measurement.

Example 9
Polyurethane of MDI with 2,4-Dimethyl-1,1-Cyclohexanedimethanol

A white polymer was obtained using the same process as in Example 7, except for using 1.723 g (10 mmol) of 2,4-dimethyl-1,1-cyclohexanedimethanol in place of 2-methyl-1,1-cyclohexanedimethanol of Example 7.

The $^1$H-NMR, $^{13}$C-NMR and IR spectrum data and assignments of the compound thus obtained are shown below.

$^1$H-NMR (δ, ppm, DMSO-d6):

0.84–0.90 m (—CH(CH$_3$)—)

1.01–1.47 m, 1.70–1.76 m (C(cyclohexane)—H)

3.79 s (arom.—CH$_2$—arom.)

4.07–4.27 (m, —CH$_2$O—)

7.09 d, 7.39 d (m, C(arom.)—H)

9.51 s (—NH—)

$^{13}$C-NMR (δ, ppm, DMSO-d6, *: undetected due to overlapping with solvent signal):

16.2, 22.2 (—CH($\underline{C}$H$_3$)—)

29.7, 29.9, 32.2, 34.3, ca.40* (C(cyclohexane)) ca.40* (arom.—$\underline{C}$H$_2$—arom.)

62.1, 67.9 (—CH$_2$O—)

118.3, 128.8, 135.4, 137.1 (C(arom.))

153.6 (—OC(O)—)

IR (cm$^{-1}$, KBr briquette method):

3310, 1712, 1600, 1522

From these results, the compound thus obtained was identified as the polyester of MDI with 2,4-dimethyl-1,1-cyclohexanedimethanol.

The molecular weight of this polymer was measured by GPC and was found to have a number average molecular weight Mn of 5,200 and a weight average molecular weight Mw of 11,700.

Furthermore, the Tg of this polymer was 146° C. as determined by DSC measurement.

Example 10
Synthesis of Polyesterpolyol of Adipic Acid with 2-Methyl-1,1-Cyclohexanedimethanol To a 3000 ml-volume flask equipped with an induction stirrer and a fractionating tower were added 1309 g (8.274 mol) of 2-methyl-1,1-cyclohexanedimethanol and 916.8 g (6.274 mol) of adipic acid. After displacing the volume of the flask with nitrogen, the flask was heated by dipping in an oil bath to distill water produced at 160–180° C. After reacting for 5 hours, the pressure in the system was gradually reduced to accelerate the distillation of water, and the reaction was continued for about 20 hours finally at 60 mmHg until the distillation of water was completed. As a result, a faintly brown transparent viscous liquid was obtained.

The $^1$H-NMR, $^{13}$C-NMR spectrum and IR spectrum of the compound thus obtained were measured. The spectrum data and assignments are shown below.

$^1$H-NMR (δ, ppm, CDCl$_3$):

0.90–0.94 m (—CH$_3$)

1.25–1.66 m (C(cyclohexane)—H, C—CH$_2$—C (adipic acid))

2.23–2.33 m (—CH$_2$COO—)

3.53 m (—CH$_2$OH)

3.96–4.23 m (—CH$_2$O—CO)

$^{13}$C-NMR (δ, ppm, CDCl$_3$)

15.8 (—CH$_3$)

21.3, 21.4, 28.1, 28.3, 29.0, 30.3, 33.6, 33.7, 33.9, 39.3, 40.6, 40.7 (C(cyclohexane), C—CH$_2$—CH$_2$COO— (adipic acid)

62.4, 63.8, 64.8, 66.5, 67.3, 68.4 (—CH$_2$O—)

173.1, 173.7 (—C(O)O—)

IR (cm$^{-1}$, KBr liquid film method):

1736 ($\nu_{C=O}$)

From these results, the compound thus obtained was identified as the polyesterpolyol of adipic acid with 2-methyl-1,1-cyclohexanedimethanol.

The polyesterpolyol thus obtained had an acid value of 0.96 and a hydroxyl group value of 108.2.

Example 11

Synthesis of Polyester of Adipic Acid with 3-Methyl-2,2-Norbornanedimethanol

A faintly brown viscous liquid matter was obtained using the same process as in Example 10, except for using 134.82 g (0.7919 mol)of 3-methyl-2,2-norbornanedimethanol in place of 2-methyl-1,1-cyclohexanedimethanol and using 86.50 g (0.5919 mol) of adipic acid in Example 10.

The $^1$H-NMR, $^{13}$C-NMR and IR spectrum data and assignments of the compound thus obtained are shown below.

$^1$H-NMR (δ, ppm, CDCl$_3$):

0.93–0.97 m (—CH$_3$)

1.17–1.25 m, 1.38–1.44 m, 1.53–1.77 m, 1.89–1.90 m, 2.16 s (C(norbornane)—H, C—CH$_2$—C (adipic acid))

2.33–2.34 m (—CH$_2$COO—)

3.53 m (—CH$_2$OH)

4.08–4.25 m (—CH$_2$O—)

$^{13}$C-NMR (δ, ppm, CDCl$_3$):

15.5 (—CH(CH$_3$)—)

23.7, 24.3, 24.4, 29.2, 33.7, 33.8, 35.1, 42.2, 45.0, 45.1 (C(norbornane), C—CH$_2$—CH$_2$COO— (adipic acid)

63.0, 64.4, 65.4, 66.5, 67.3, 68.3 (—CH$_2$O—)

173.3, 173.4 (—C(O)O—)

IR (cm$^{-1}$, KBr liquid film method):

1737 ($\nu_{C=O}$)

From these results, the compound thus obtained was identified as the polyesterpolyol of adipic acid with 3-methyl-2,2-norbornanedimethanol.

The polyesterpolyol thus obtained had an acid value of 1.09 and a hydroxyl group value of 110.3.

Comparative Example 2

Synthesis of Polyesterpolyol of Adipic Acid with Ethylene Glycol

A waxy white solid polyesterpolyol was obtained using the same process as in Example 10, except for using 620.07 g (1.00 mol) of ethylene glycol in place of 2-methyl-1,1-cyclohexanedimethanol and using 73.07 g (0.500 mol) of adipic acid in Example 10. Ethylene glycol was distilled while the reaction proceeded, and the acid value and hydroxyl value were checked after 3 hours.

The polyethyleneadipate thus obtained had an acid value of 1.06 and a hydroxyl group value of 129.5.

Comparative Example 3

Synthesis of Polyesterpolyol of Adipic Acid with 1,4-Cyclohexanedimethanol

A waxy white solid polyesterpolyol was obtained using the same process as in Example 10, except for using 629.5 g (4.365 mol) of 1,4-cyclohexanedimethanol in place of 2-methyl-1,1-cyclohexanedimethanol and using 491.8 g (3.365 mol) of adipic acid in Example 10.

The polyesterpolyol thus obtained had an acid value of 1.01 and a hydroxyl group value of 106.3.

Preparation of Polyurethane from the Polyesterpolyols of Example 10 and 11, Comparative Example 2 and 3, and Evaluation of Hydrolysis Resistance Each of the polyesterpolyols prepared in Example 10, 11, Comparative Example 2 and 3 was mixed with MDI at 60° C. 1,4-butanediol was added and stirred gently until homogeneous. The weight of each component was determined by adjusting the mole ratio of OH of polyesterpolyol, NCO of MDI, and OH of 1,4-butanediol to 0.95/2/0.95.

The resulting viscous liquid was poured into a mold which consisted of a mold releasing agent-coated two glass plate with a 2 mm-thick spacer therebetween, and then placed in an oven for 6 hours at 140° C.

The thus obtained polyurethane sheet was punched to make test pieces (JIS K-7312). The test pieces were dipped in hot water at 80° C. for 10 days. The change in tensile strength of the test pieces is shown in Table 2.

The polyurethanes derived from the polyesterpolyol in Examples 10 and 11 exhibited a smaller change in tensile strength against hydrolysis as compared to the polyurethanes of the Comparative Examples, and were confirmed as having excellent hydrolysis resistance.

TABLE 2

Change in Tensile Strength of Polyurethanes by Hydrolysis

| Polyesterpolyol | Tensile strength before hydrolysis (kgf/cm$^2$) | Tensile strength after hydrolysis (kgf/cm$^2$) | Retention of tensile strength |
|---|---|---|---|
| Example 10 | 420 | 380 | 90% |
| Example 11 | 450 | 410 | 91% |
| Comparative Example 2 | 480 | 330 | 69% |
| Comparative Example 3 | 440 | 380 | 86% |

The present invention relates to novel polyester and polyurethane compounds containing a specific alicyclic diol residue.

The polyester resin of the present invention is a polyester compound having excellent transparency, good corrosion resistance, superior water resistance and high heat resistance. More particularly, the polyester of the present invention provides high temperature transparency at temperatures higher than Tg while hardly exhibiting a change in mechanical properties as compared with conventional polyester resins.

The polyurethane resin of the present invention is a polyurethane having excellent hydrolysis resistance, heat resistance and weatherability as compared with conventional polyurethane resins.

While the invention has been described in detail and with reference to specific embodiments thereof, it will be apparent to one skilled in the art that various changes and modifications can be made therein without departing from the spirit and scope thereof.

What is claimed is:

1. A polymer having a repeating unit represented by the following formula (1):

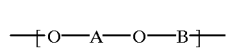

wherein A is a polyol compound residue represented by the following formula (2) or formula (3):

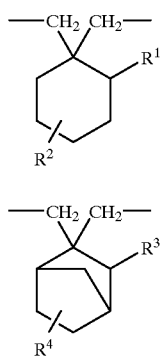

wherein $R^1$ and $R^3$ each individually represents an alkyl group having from 1 to 4 carbon atoms, and $R^2$ and $R^4$ each individually represents a hydrogen atom or a methyl group; and B is represented by the following formula (4) or formula (5):

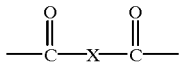

wherein X represents an alkylene, cycloalkylene, arylene or arylalkylene group having from 1 to 12 carbon atoms,

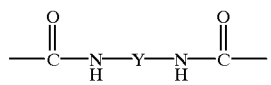

wherein Y represents an alkylene, cycloalkylene, arylene or arylalkylene group having from 1 to 12 carbon atoms.

2. The polymer as claimed in claim 1, wherein $R^1$ in formula (2) is a methyl group.

3. The polymer as claimed in claim 1, wherein $R^3$ in formula (3) is a methyl group.

4. A polyester having a repeating unit represented by the following formula (6):

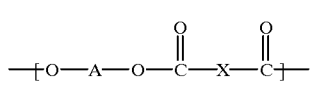

wherein A is a polyol compound residue represented by the following formula (2) or formula (3):

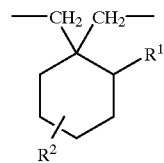

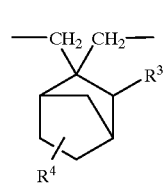

wherein $R^1$ and $R^3$ each individually represents an alkyl group having from 1 to 4 carbon atoms, and $R^2$ and $R^4$ each individually represents a hydrogen atom or a methyl group; and X represents an alkylene, cycloalkylene, arylene or arylalkylene group having from 1 to 12 carbon atoms.

5. The polyester as claimed in claim 4, wherein $R^1$ in formula (2) is a methyl group.

6. The polyester as claimed in claim 4, wherein $R^3$ in formula (3) is a methyl group.

7. A polyurethane having a repeating unit represented by the following formula (7):

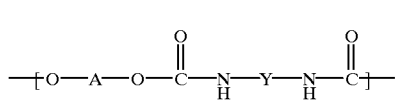

wherein A is a polyol compound residue represented by the following formula (2) or formula (3):

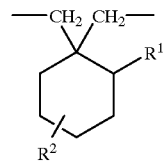

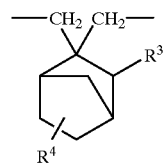

wherein $R^1$ and $R^3$ each individually represents an alkyl group having from 1 to 4 carbon atoms, and $R^2$ and $R^4$ each individually represents a hydrogen atom or a methyl group; and Y represents an alkylene, cycloalkylene, arylene or arylalkylene group having from 1 to 12 carbon atoms.

8. The polyurethane as claimed in claim 7, wherein $R^1$ in formula (2) is a methyl group.

9. The polyurethane as claimed in claim 7, wherein $R^3$ in formula (3) is a methyl group.

10. A polyurethane obtained by polyaddition of a polyol compound to a polyisocyanate compound, wherein the polyol compound is entirely or partially a polyesterpolyol comprising a repeating unit represented by the formula (6):

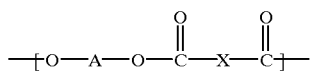

wherein A is a polyol compound residue represented by the following formula (2) or formula (3):

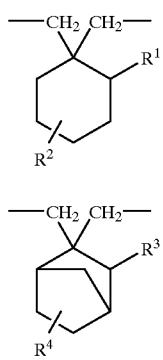

wherein $R^1$ and $R^3$ each individually represents an alkyl group having from 1 to 4 carbon atoms, and $R^2$ and $R^4$ each individually represents a hydrogen atom or a methyl group; and X represents an alkylene, cycloalkylene, arylene or arylalkylene group having from 1 to 12 carbon atoms.

11. The polyester as claimed in claim 4, comprising a diol residue represented by formula (2) or (3) in an amount of from 5 to 100 mol % of all diol components contained in the polyester.

12. The polyester as claimed in claim 4, comprising a diol residue represented by formula (2) or (3) in an amount of 20 mol % or more of all diol components contained in the polyester.

13. The polyurethane as claimed in claim 7, comprising a diol residue represented by formula (2) or (3) in an amount of from 5 to 100 mol % of all diol components contained in the polyurethane.

14. The polyurethane as claimed in claim 7, comprising a diol residue represented by formula (2) or (3) in an amount of from 10 to 100 mol % of all diol components contained in the polyurethane.

15. The polyurethane as claimed in claim 10, comprising a diol residue represented by formula (2) or (3) in an amount of from 10 to 100 mol % of all diol components contained in the polyurethane.

16. The polyurethane as claimed in claim 10, comprising a diol residue represented by formula (2) or (3) in an amount of from 20 to 100 mol % of all diol components contained in the polyurethane.

* * * * *